United States Patent [19]
Gassmann

[11] Patent Number: 5,562,191
[45] Date of Patent: Oct. 8, 1996

[54] VISCOUS COUPLING

[75] Inventor: Theodor Gassmann, Siegburg, Germany

[73] Assignee: GKN Automotive AG, Lohmar, Germany

[21] Appl. No.: 360,405

[22] Filed: Dec. 21, 1994

[30] Foreign Application Priority Data

Dec. 22, 1993 [DE] Germany .................... 43 43 917.9

[51] Int. Cl.⁶ .................................................. F16D 35/00
[52] U.S. Cl. ........................................ 192/58.42; 192/58.6
[58] Field of Search .................. 192/58.4, 58.41, 192/58.42, 58.43, 58.5, 58.6, 58.67

[56] References Cited

U.S. PATENT DOCUMENTS

| | | | |
|---|---|---|---|
| 4,040,271 | 8/1977 | Rolt et al. | 192/58.42 |
| 4,058,027 | 11/1977 | Webb . | |
| 4,703,842 | 11/1987 | Leinfellner et al. | 192/58.41 |
| 4,844,219 | 7/1989 | Stockmar | 192/58.42 |
| 5,004,085 | 4/1991 | Taureg | 192/58.41 |

FOREIGN PATENT DOCUMENTS

| | | |
|---|---|---|
| 3408977A1 | 9/1985 | Germany . |
| 3539484C1 | 12/1986 | Germany . |
| 4010195A1 | 10/1991 | Germany . |
| 1412583 | 11/1975 | United Kingdom . |

Primary Examiner—Richard M. Lorence
Attorney, Agent, or Firm—Dinnin & Dunn, P.C.

[57] ABSTRACT

A viscous coupling has a housing (2) and a hub (24), and a separating wall (8). An operating chamber (33) is formed between the housing (2), hub (24) and separating wall (8). Inner plates (37) and outer plates (35) are alternately arranged in the chamber (37). A compensating chamber (34) is formed between a housing extension (3), the separating wall (8), the hub (24) and a movable wall (15) axially loaded by a spring (17). The compensating chamber (34) and the operating chamber (33) are connected to one another by a throttling bore (12). Both chambers (33, 34) are filled with a highly viscous fluid. By filling the operating chamber (33) completely by loading the compensating chamber (34) towards assuming its minimum volume, it is possible to provide a coupling with progressive characteristics which ensure a rapid coupling response and thus an improvement in vehicle traction.

15 Claims, 4 Drawing Sheets

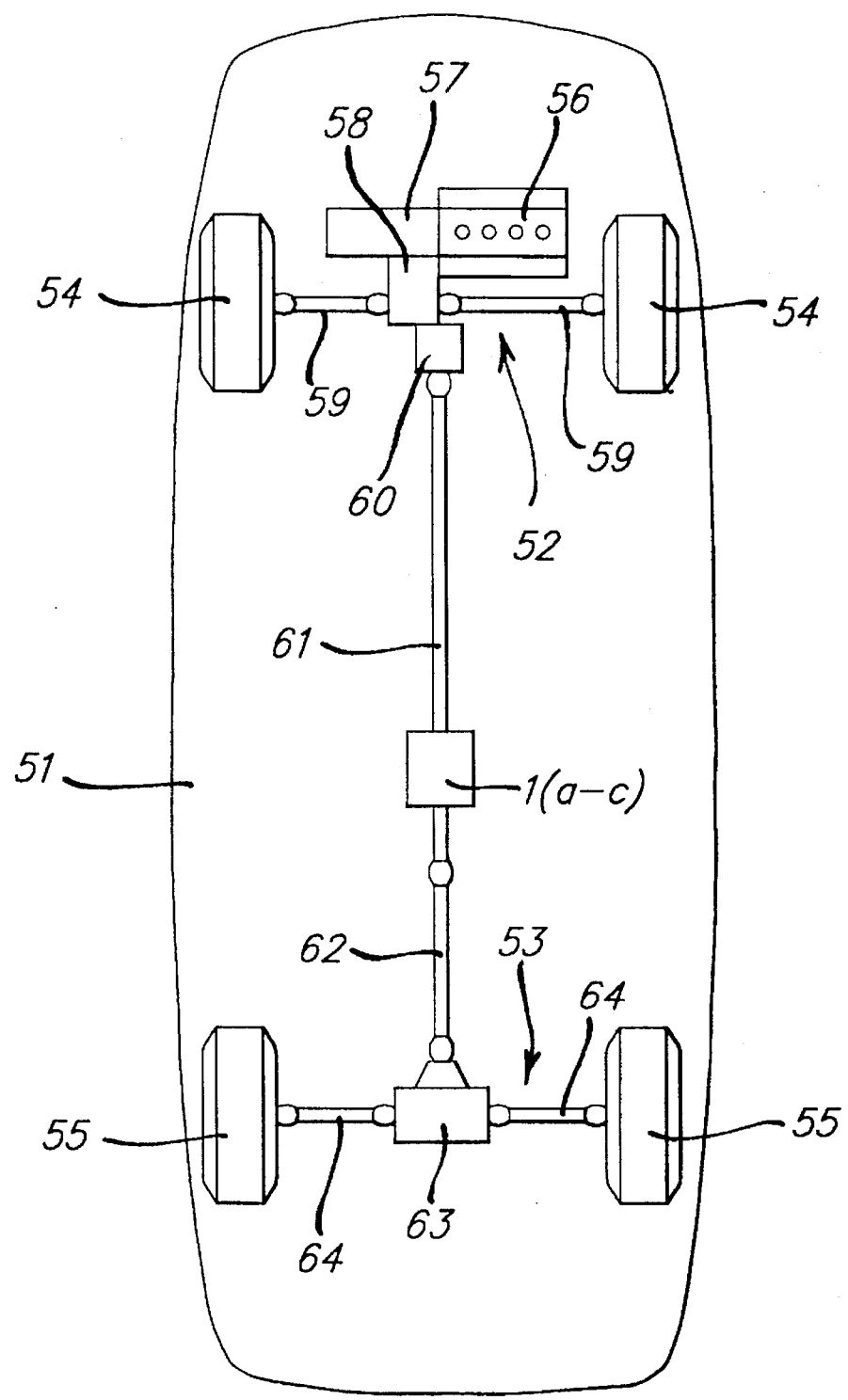
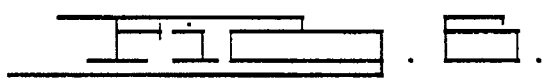

VISCOUS COUPLING

BACKGROUND OF THE INVENTION

The invention relates to a viscous coupling having a housing rotatable around a rotational axis and a hub rotatable relative thereto. The housing and hub, together, form an operating chamber. The housing and hub have annular outer plates and annular inner plates which, in an at least a partially radially overlapping way, are alternately arranged in the operating chamber in a certain sequence. The outer plates are non-rotatably connected to the housing and the inner plates are non-rotatably connected to the hub. The outer plates or the inner plates are arranged at a distance from one another in the operating chamber. The coupling has a highly viscous fluid, especially silicone oil, as an operating medium in the operating chamber. The medium, in the case of a relative rotation between the housing and the hub, is subject to shear. The coupling has a compensating chamber which is separated from the operating chamber and which serves to accommodate any fluid which may escape from the operating chamber through a connecting means connecting the two chambers.

DE 26 07 353 A1, published Sep. 9, 1976, describes a viscous coupling. It has a housing having an operating chamber and a compensating chamber. The operating chamber serves to accommodate plates and fluid. In one variant, the compensating chamber is provided in the form of a hub bore. In a further variant, the compensating chamber is provided in the form of at least one bore in the housing. Each compensating chamber has an adjustable piston. Each piston is loaded by a spring. When the fluid expands, the pressure in the housing increases. The pressure causes a displacement of the respective piston(s) from its/their position(s), with a minimum compensating volume. The magnitude of the displacement is determined by springs. In the case of the variant having a hub bore, the fluid enters through slots from the operating chamber into the compensating chamber. Furthermore, the arrangement is such that, in the case of a maximum displacement, the pistons are positioned in an increased diameter bore region. In this piston position, the fluid is able to flow past the pistons and out of the housing.

Such a viscous coupling whose compensating chamber is open towards the operating chamber permits the pressure increase in the housing to be controlled by selecting the spring which loads the piston. Furthermore, from a maximum pressure value onwards, the pressure in the housing is discharged from the housing. Thus torque characteristics are obtained where the torque initially increases in a delayed way, with the pressure remaining constant from a maximum pressure value onwards. From the moment the transmission of torque begins, the pressure increase in the housing is controlled by the piston giving way through compensation of volume as a function of the spring rate. The level up to which the housing is filled with fluid has a considerable influence both on the onset of torque transmission and on the transmitted torque. Loading the pistons by springs initially causes a compensation of volume, with the pressure increasing. This type of embodiment of a viscous coupling causes the torque to be transmitted as a result of the shear effect of the fluid between the plates. As a result, optimum torque transmission is not ensured. When a speed differential occurs, the transmission of torque is additionally delayed.

DE 39 08 090 C1, issued Nov. 11, 1989, describes a further viscous coupling. In addition to the operating chamber occupied by plates, a compensating chamber is provided with a constant volume. When a certain speed limit is exceeded, the two chambers are connected to one another by an aperture which is opened by a slide actuated by centrifugal force so that at high speeds, the coupling is prevented from transferring into the hump mode. When the hump mode occurs, the plates contact one another in a friction-locking way, so that a direct drive occurs. The differential speed has a tendency to approach zero.

As a differential speed sensing system, the viscous coupling has advantages as compared to torque sensing systems as far as traction and driving dynamics are concerned. However, the degressive torque characteristics of the prior art viscous lock can only ever constitute a compromise between traction requirements, permissible driveline torsion, steering reactions and influencing the braking stability.

However, taking advantage of the hump mode has definite advantages in respect of increasing the coupling moment as a result of the thermally conditioned rise in internal pressure when the operating chamber of the coupling is filled completely. This makes it possible to achieve additional traction. However, the disadvantage of utilizing the thermal hump refers to the considerable time span existing between the occurrence of the need for traction and the moment when the operating chamber of the viscous coupling is filled completely and when the pressure increases therein, two conditions to be met for achieving the hump mode.

Differential locks with entirely progressive torque characteristics, admittedly, demonstrate a better traction behavior, but because there is no locking effect at low differential speeds, they do not exert the positive influence on vehicle handling and the driving behavior of the vehicle as a viscous coupling. This is the reason why such torque sensing systems are disadvantageous.

SUMMARY OF THE INVENTION

It is therefore an object of the invention to further develop a viscous coupling such that, by taking advantage of the method of controlling the internal pressure in the housing interior as a function of the differential speed, with the housing interior being occupied by the plates and the operating fluid, it is possible to achieve progressive torque characteristics.

In accordance with the invention, the objective is achieved by permanently connecting the compensating chamber to the operating chamber by at least one throttling bore. Further, the compensating chamber is variable between a maximum and a minimum volume and is loaded by pressure means to assume the minimum volume.

As a result of the pressurized medium, the condition of the operating chamber having to be filled completely is met even if there is no speed differential. Furthermore, it is possible to set a certain internal pressure in the cold condition, thereby achieving progressive torque characteristics because even small speed differential values lead to a rapid increase in the internal pressure in the case of which thermal fluid expansion is utilized. By providing a throttling bore, the pressure balance between the operating chamber and the compensating chamber is necessarily effected slowly. By selecting the throttling bore, it is possible to influence the pressure in the operating chamber. By predetermining the throttling effect and the pretension of the compensating chamber, it is possible to achieve a certain static system pressure when the operating chamber is filled completely and to balance the thermal fluid expansion. By limiting the compensating chamber to a maximum volume, it is possible for the thermally caused hump mode to occur as a result of the differential speed in order to prevent the coupling from overheating.

The progressive torque characteristics of a coupling in accordance with the invention, while achieving a good traction behavior, enable the basic characteristics to be adjusted in an optimum way in respect of driving dynamics and braking stability.

The hump mode may amount to a multiple of the moment occurring when the fluid is sheared and is used both to enable the coupling to protect itself and to improve traction in extreme situations. However, in the case of prior art couplings, the above-mentioned thermal hump mode is only conditionally suitable for traction improving purposes.

The invention takes advantage of the fact that, in principle, the hump mode also occurs independently of the coupling temperature provided the conditions of a completely filled operating chamber and an increased internal pressure are met. As a result of the progressive increase in the internal pressure as a function of the differential speed, the increase in torque is also progressive. The operating mechanism is independent of the stationary coupling temperature. Therefore, it is only a function of the temperature gradient in the operating chamber and thus entirely a function of the speed differential.

In more detail, it is proposed that, for the purpose of changing its volume, the compensating chamber includes a movable wall which is loaded by a spring which is the pressure means. The spring rate may be determined such that the required progressive characteristics occur by taking into account the viscosity of the viscous fluid. To the compensating chamber, the housing is provided with a housing extension. A separating wall is provided to separate the compensating chamber from the operating chamber. The movable wall is axially movably guided at the inner face of the housing extension associated with the compensating chamber and relative to the hub. For the purpose of closing and sealing the compensating chamber, the movable wall is sealed by seals relative to the inner face of the housing extension and relative to the hub.

The separating wall is preferably provided with at least one throttling bore, but preferably with a plurality of circumferentially distributed throttling bores. The throttling bores are preferably arranged in the separating wall inclined relative to the longitudinal axis so that the throttling bore opening at the compensating chamber end approaches the hub. The opening at the operating chamber end is arranged to be offset radially outwardly relative to the teeth of the housing. In this way, it is possible to achieve a long throttling bore length and a high throttling effect. To limit the compensating volume to a maximum, the axial movement of the movable wall is limited.

It is a known fact that the viscosity of the fluid changes as a function of temperature. To compensate for temperature influence as regards the effect of the throttling bores, it is proposed that a pin made of a material whose expansion coefficient is greater than that of the material of the separating wall is inserted into the throttling bore or at least one of the throttling bores.

As explained in DE 39 08 090 C1, it may be advantageous if at high driving speeds, which corresponds to a higher absolute speed of the coupling, the occurrence of the hump effect or of progressivity is prevented. To achieve this, in the case of the coupling in accordance with the invention, it is additionally proposed that the separating wall include at least one further aperture. The aperture is closed by a slide and positioned between the operating chamber and the compensating chamber. The aperture is opened by the slide to exchange fluid when a predetermined absolute speed of the viscous coupling is exceeded. In this way, the system achieves complete brake compatibility, including those systems provided with anti-lock braking devices. By opening the additional aperture and thus providing an additional connection between the operating chamber and the compensating chamber, the occurrence of the hump effect above a defined absolute speed is thus prevented.

The slide is preferably actuated by centrifugal force and radially movably guided in a radially extending bore of the separating wall. The slide is loaded by a closing spring in the direction of the closing position in which the aperture is closed. In the case of extreme braking operations or vehicles with anti-lock braking systems it is possible for very high speed differentials to occur temporarily, which, in turn, may result in high locking moments which may very adversely affect the braking stability of the vehicle. To prevent the progressive locking effect of the coupling in accordance with the invention from coinciding with such a condition, it is proposed to delay the occurrence of the progressive locking effect for a defined period of time by means of one or by a combination of several of the solutions described below.

According to a first embodiment it is proposed that, to a limited extent, the separating wall is axially movably guided in the direction of the movable wall for the purpose of increasing the operating chamber. Thus, progressively may be delayed, which delay is dependent on the stroke of the separating wall.

According to a further embodiment, it is possible to provide an additional compensating volume in the form of an escape chamber which adjoins the operating chamber and includes a variable, but limited volume. In a preferred embodiment, the escape chamber is formed by a bore in which a spring-loaded piston is adjustably guided. The spring is designed such that its pretensioning characteristics are higher than those of the spring for the compensating chamber, but with the full piston cross-section available for escaping purposes. The volume of the operating chamber can therefore be increased quickly. The pressure in the operating chamber cannot be built up until the escape chamber is filled. The delay in progressivity in terms of time may be determined by the size of the escape chamber.

BRIEF DESCRIPTION OF THE DRAWINGS

Preferred embodiments of the invention are diagrammatically illustrated in the drawing wherein:

FIG. 6 a schematic view of the basic design of a four wheel drive vehicle having a viscous coupling in accordance with the invention.

DETAILED DESCRIPTION OF THE PREFERRED EMBODIMENT

Figure 1:
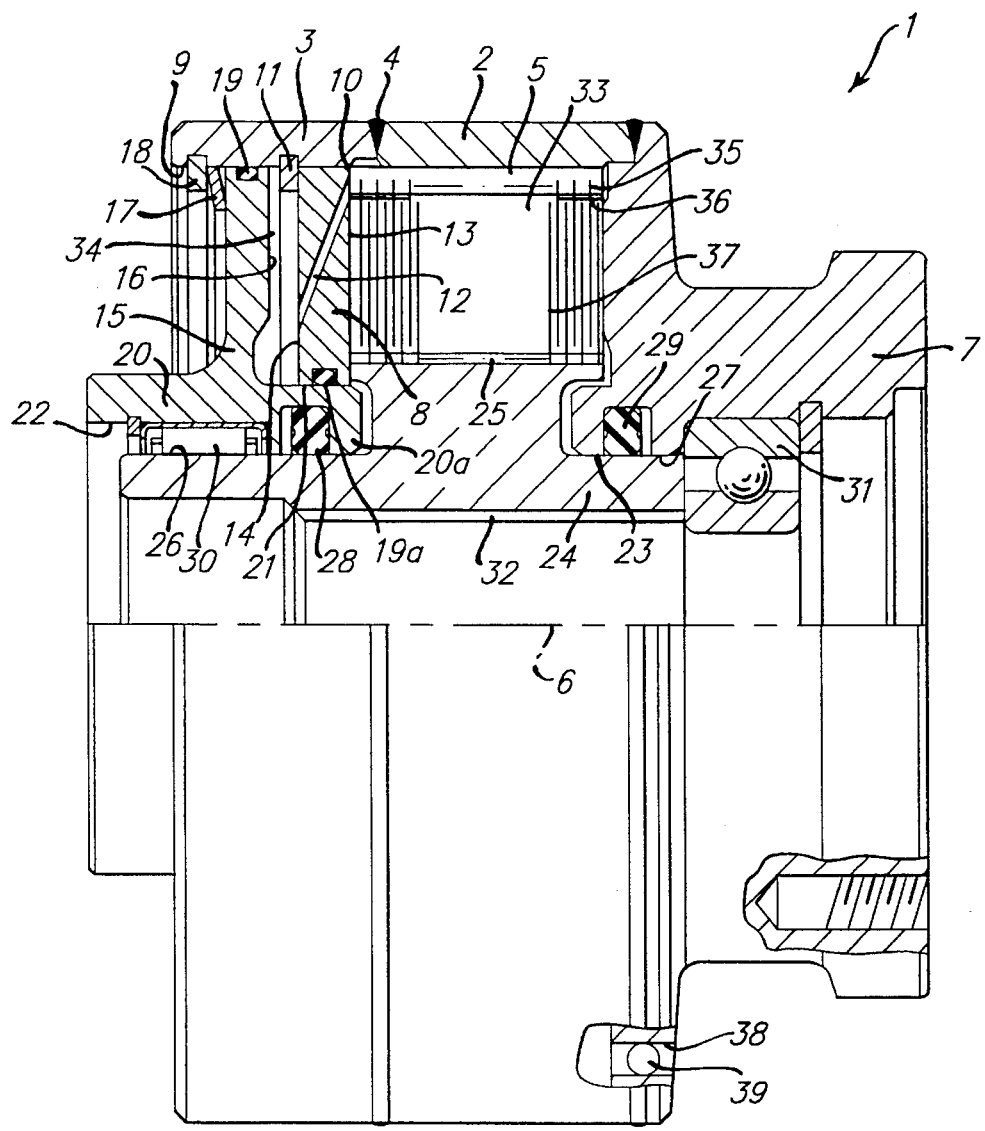
FIG. 1 a half longitudinal section view through a first embodiment of a coupling in accordance with the invention.

FIG. 1 shows a first variant of a viscous coupling 1. The housing 2 includes a substantially cylindrical housing casing whose inner face is provided with toothing means which includes circumferentially distributed teeth 5 which extend parallel to the longitudinal axis 6. Towards the righthand side of the housing a radially inwardly extending cover 7 is provided which serves as a flange to connect a driving or a driven drive member. The casing of the housing 2 is extended around the housing extension 3 towards the left, away from the cover 7. The housing extension 3 and the housing 2 are sealingly connected to one another by a weld 4. The housing extension 3 includes a cylindrical bore with an inner face 9.

The separating wall 8, by means of its first end face 13, axially rests against a contact face 10 which is formed by the end of the teeth 5. The wall 8 is secured in position by a securing ring 11 inserted into a groove in the inner face 9 of the housing extension 3. Between the first end face 13, which extends towards the cover 7, and the end face 14 of the separating wall, which faces away therefrom, a throttling bore 12 is arranged which extends at an angle relative to the longitudinal axis 6. The bore 12 opening facing the second end face 14 approaches the longitudinal axis 6, which also forms the rotational axis. The bore 12 opening facing the first end face 13 is positioned in the region of the teeth 5 of the housing 2 and is thus removed from the longitudinal axis 6.

On the cylindrical inner face 9 of the housing extension 3 a movable wall 15 is guided axially. The wall 18 is guided so as to be adjustable along the longitudinal axis 6. The wall end face 16 faces the second end face 14 of the separating wall 8. The end face of the movable wall 15 facing away therefrom is loaded by a spring 17, whose other end is supported on a securing ring 18 inserted into a groove in the inner face 9 of the housing extension 3.

A seal 19 is provided on the outer circumferential face of the movable wall 15, which is guided on the inner face 9. The movable wall 15 includes a projection 20 provided with a central bore 22. Furthermore, the movable wall 15 includes a further projection 20a which faces the cover 7. The projection 20a includes an outer face which is guided in the bore 21 of the separating wall 8, with a further seal 19 inserted between the outer face and the bore 21 of the separating wall 8. A hub 24 is inserted into the bore 21 so as to extend coaxially relative to the longitudinal axis 6 of the housing 2 and of the housing extension 3.

Opposite the teeth 5 of the housing 2, the hub 24 includes outer teeth 25 which extend parallel to the longitudinal axis 6. The hub 24 is held axially between the cover 7 and the separating wall 8. It also includes a first bearing face 26 and a second bearing face 27. By means of its first bearing face 26 the hub 24 is guided in the bore 22 of the movable wall 15, with a needle bearing 30 inserted therebetween, and by means of its second bearing face 27 it is guided in the bore 23 of the cover 7. The hub 24 is thus held to be rotatable relative to the housing 2 and the housing extension 3.

A seal 28 is inserted between the projection 20a and the first bearing face 26, with a second seal 29 inserted between the second bearing face 27 and the bore 23 of the cover 7. Furthermore, a ball bearing 31 to support the coupling 1 as a complete unit is arranged in a bore of the cover. The support is provided on a shaft or drive element (not illustrated). The hub 24 is provided with inner teeth 32 to be connected to a driving or driven drive element. By providing seals 19, 28, 29, a sealed coupling interior is formed which includes the operating chamber 33 and the compensating chamber 34.

The operating chamber 33 is formed between the housing which includes the housing casing and the cover 7, the hub 24 and the separating wall 8. The compensating chamber 34 is formed by the housing extension 3, the separating wall 8, the movable wall 15 and its projection 20a. The operating chamber 33 is connected to the compensating chamber 34 by means of the throttling bore 12.

In the operating chamber 33, outer plates 35 and inner plates 37 are arranged in a certain sequence along the longitudinal axis 6. The outer plates 35 are associated with the housing 2 and by means of teeth on their outer contour, they non-rotatingly engage the teeth 5. Furthermore, spacing rings 36 space the outer plates 35 relative to one another and relative to the cover 7 and the separating wall 8. An inner plate 7 is arranged between each two outer plates 35. The inner plates 37, in their bores, include circumferentially distributed teeth which correspond to, and engage, the teeth 25. The inner plates 37 are movable along the longitudinal axis 6.

The operating chamber 33 is completely filled with a viscous fluid, for example a highly viscous silicone oil. The compensating chamber 34 is also filled with a viscous fluid, as illustrated in FIG. 1. The compensating chamber 34 assumes a minimum volume in the cold condition in which the end face 16 of the movable wall 15 approaches the second end face 14 of the separating wall 8. A filling bore 38 is provided for filling purposes. The bore 38 is closed by a closing member 39 in the form of a ball for example.

By means of the spring rate of the spring 17 it is possible to predetermine the internal pressure in the operating chamber 33 and the compensating chamber 34 in the cold condition.

If a speed differential occurs between the hub 24 and the housing 2 and thus between the outer plates 35 and the inner plates 37, the viscous fluid is sheared and the resulting rise in temperature leads to a thermally conditioned increase in the internal pressure in the operating chamber 33. As a result of the pretension and the increase in internal pressure, a progressive increase occurs in the torque characteristics, the torque transferable between the hub 24 and the housing 2 increases progressively. Such an increase can be influenced by the throttling bore 12 because it is only in a delayed way that the fluid is able to escape from the operating chamber 33 into the compensating chamber 34.

An exchange of fluid takes place between the two chambers 33, 34 until the movable wall 15 is transferred into the outermost position displaced towards the left, as a result of which the compensating chamber 34 has assumed its maximum volume. As the pressure continues to increase, it is possible for the thermal hump to occur in the case of which the outer plates 35 and the inner plates 37 are in friction contact which is achieved by the inner plates 37 moving in a controlled way at the teeth 25 of the hub 24. The way in which such a movement can be influenced is known in itself. There are various proposals for influencing the movement.

Figure 2A:
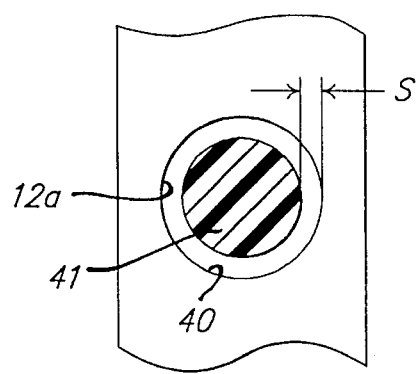
FIG. 2A is an enlarged view along line 2a—2a of FIG. 2 referring to throttling the exchange of fluid between the operating chamber and the compensating chamber.
Figure 2:
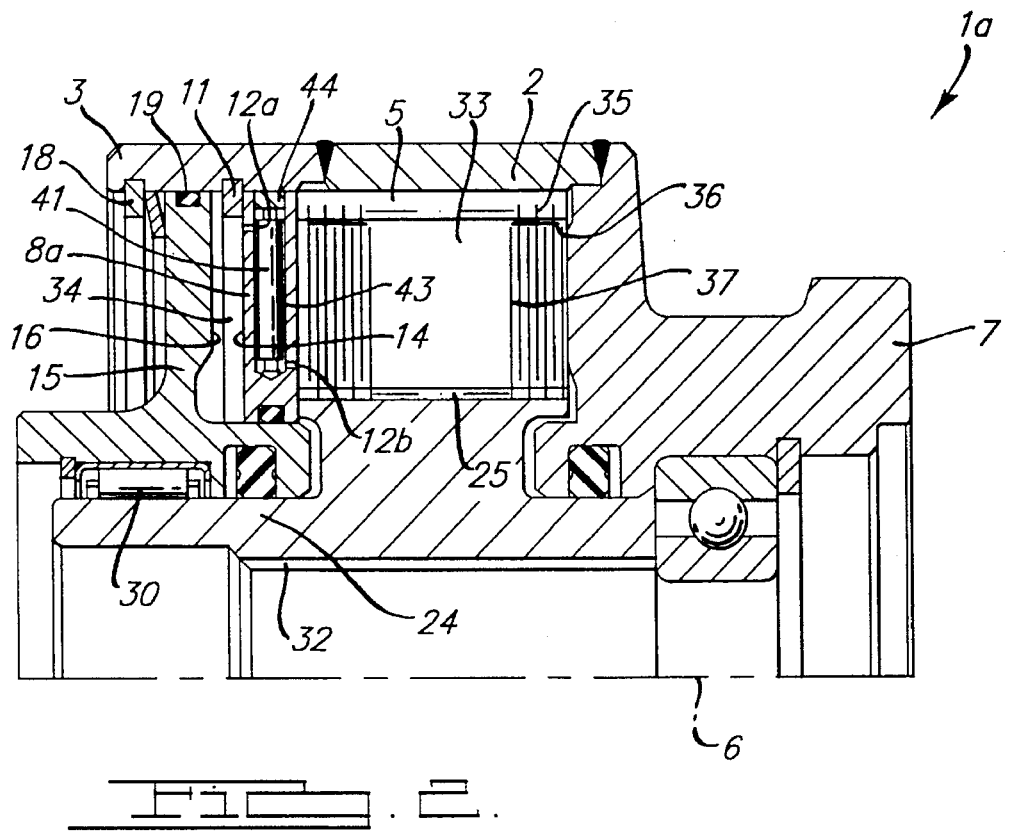
FIG. 2 is a half longitudinal section view of a detail of an alternative embodiment.

As the viscosity of the viscous medium decreases with an increasing temperature, the throttling effect of the throttling bore 12 may be advantageously influenced by a modified embodiment as shown in FIG. 2. A throttling member 41 is inserted into a throttling bore 12a which extends at a right angle relative to the longitudinal axis 6. By means of throttling bores 12b which extends parallel to the longitudinal axis 6, the throttling bore 12a is connected to the compensating chamber 34 at its radially outer end and to the operating chamber 33 at its radially inner end. The inserted throttling member 41 includes conical ends which are received in conical recesses which, on the one hand, are located inside the throttling bore 12a in the housing 2 and which, at the opening end, are arranged at a plug 44 which closes the throttling bore 12a towards the outside.

In this embodiment, the throttling member 41 is centered in the throttling bore 12a so that there exists a gap S between the throttling member 41 and the wall of the throttling bore 12a as seen in FIG. 2a. As a result, the throttling member 41 is substantially fixed in the direction of the bore axis. In the region where the throttling bores 12b enter the throttling bore 12a, the throttling member 41 includes an annular groove which extends around the throttling member 41. The fluid flowing in through one of the throttling bores 12b collects in one of the annular grooves and flows through the gap S in the region of the entire circumference of the throttling member 41 into the other annular groove and, thereafter, flows through the second throttling bores 12b associated with the annular groove into the respective housing chamber of the viscous coupling.

The throttling member 41 includes a material whose thermal expansion coefficient is greater than that of the separating wall 8. The material for the throttling member 41 may be plastics for example, PTFE, whereas the separating wall is steel. As a result, when the temperature rises, the gap S is reduced so that, with an increasing temperature, the throttling effect of the viscous medium is increased.

Figure 3:
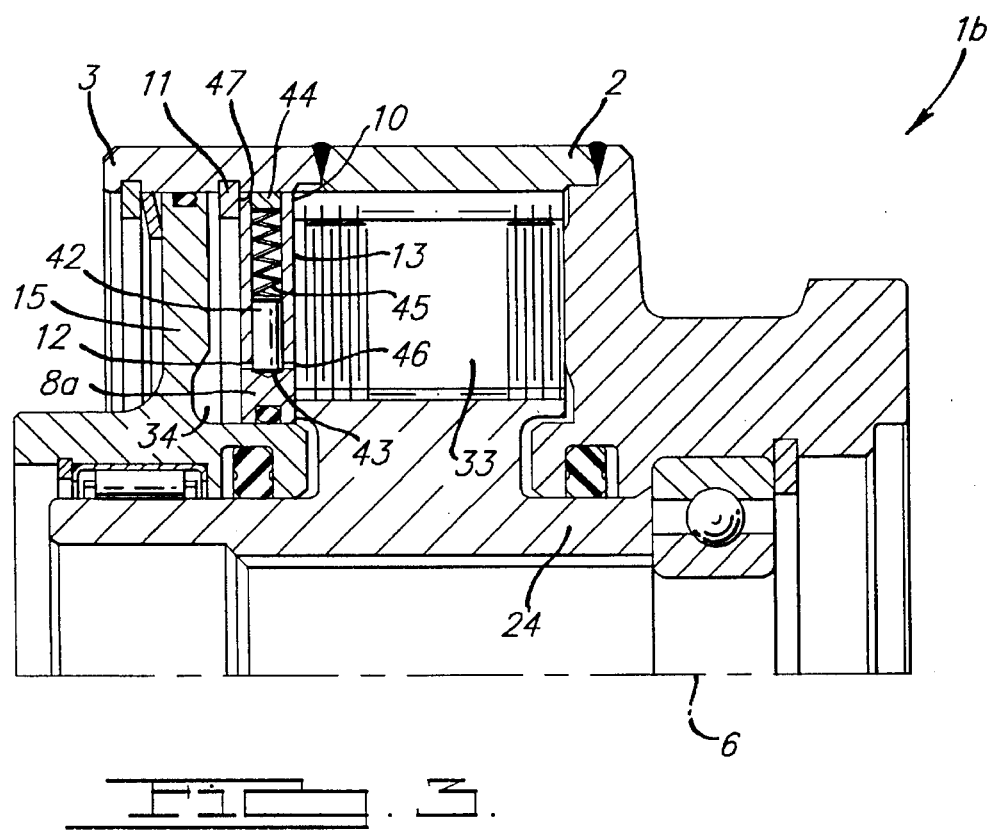
FIG. 3 is half a longitudinal section view through another embodiment which, apart from the throttling bores (not visible), includes at least one slide which is operated by a centrifugal force and which discontinues progressivity when a certain absolute speed is exceeded.

FIG. 3 shows a further embodiment of a viscous coupling according to FIG. 1. The radial section of FIG. 3 differs from that of FIG. 1. The separating wall 8a of the viscous coupling according to FIG. 3 is also provided with circumferentially distributed throttling bores 12 according to FIG. 1 or with those according to FIG. 2. In addition, there are provided one or several radially distributed apertures 46 which extend parallel to the longitudinal axis 6 and which may be closed or opened by a slide 42.

The slide 42 is movably guided in a radially extending bore 43 of the separating wall 8a. For this purpose, it is inserted from the outer face of the separating wall 8a into the bore 43. A closing spring 45 is supported against the base of the slide 42. The other end of the closing spring 45 is axially supported against a plug 44 which closes the bore 43. The pretension of the closing spring 45 may be set by the plug 44. The slide 42 is cylindrical. In its position where it approaches the longitudinal axis 6, its outer face closes the aperture 46 and thus the connection between the operating chamber 33 and the compensating chamber 34.

When the housing 2 of the coupling 1a with the separating wall 8a reaches a predetermined speed, the centrifugal force causes the slide 42 to escape radially outwardly against the force of the closing spring 45, thereby releasing the aperture 46 and thus the connection between the operating chamber 33 and the compensating chamber 34, thereby permitting a free exchange between the two chambers. In this condition a transfer into the hump mode or progressivity is prohibited.

Figure 4:
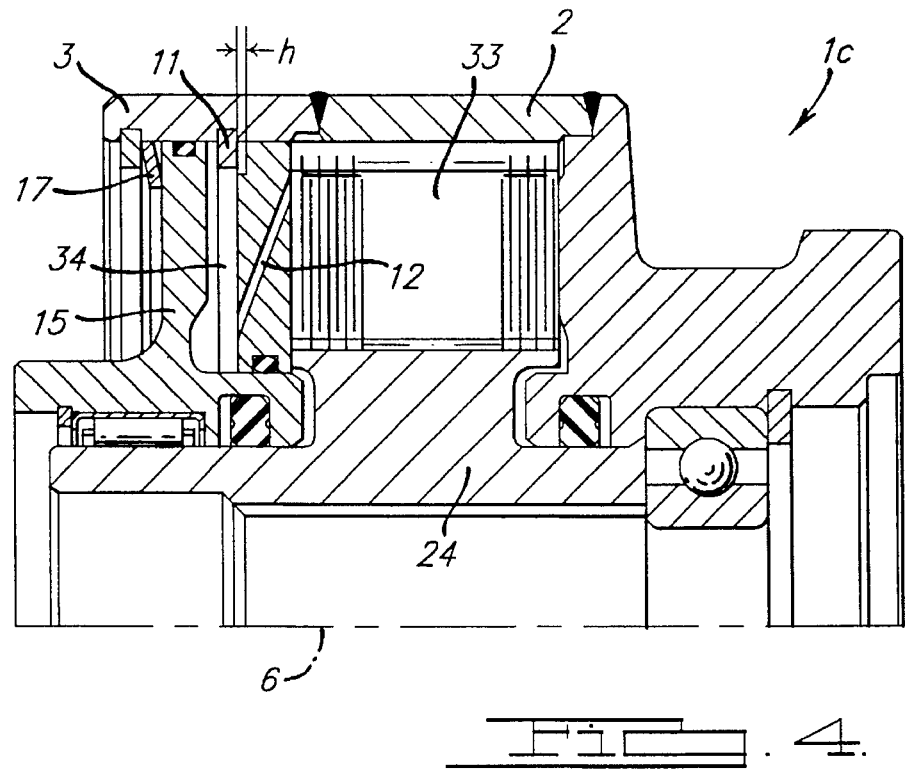
FIG. 4 is a half longitudinal section view of a further embodiment of the viscous coupling according to FIG. 3, with the separating wall being axially movable for the purpose of delaying, in terms of time, the occurrence of progressivity.

FIG. 4 shows an additional embodiment of the viscous coupling according to FIG. 3. Here the separating wall 8a is additionally freely adjustable axially, parallel to the longitudinal axis 6, by the amount H. Normally, the separating wall 8a, by means of its first end face 13, axially rests against the contact face 10 of the housing 10. If a speed differential occurs between the housing 2 and the hub 24, with an increase in internal pressure occurring in the operating chamber 33, initially the separating wall 8a may be moved axially by the stroke H towards the left in the direction of the movable wall 15 until it comes to rest against the securing ring 11. As a result, the occurrence of progressivity is delayed. If the speed differential occurs only temporarily, the separating wall 8a returns into its starting position and the coupling 1b is prevented from responding. When the separating wall 8a moves axially by the stroke H, it contacts the securing ring 11 by means of its contact face 47.

Figure 5:
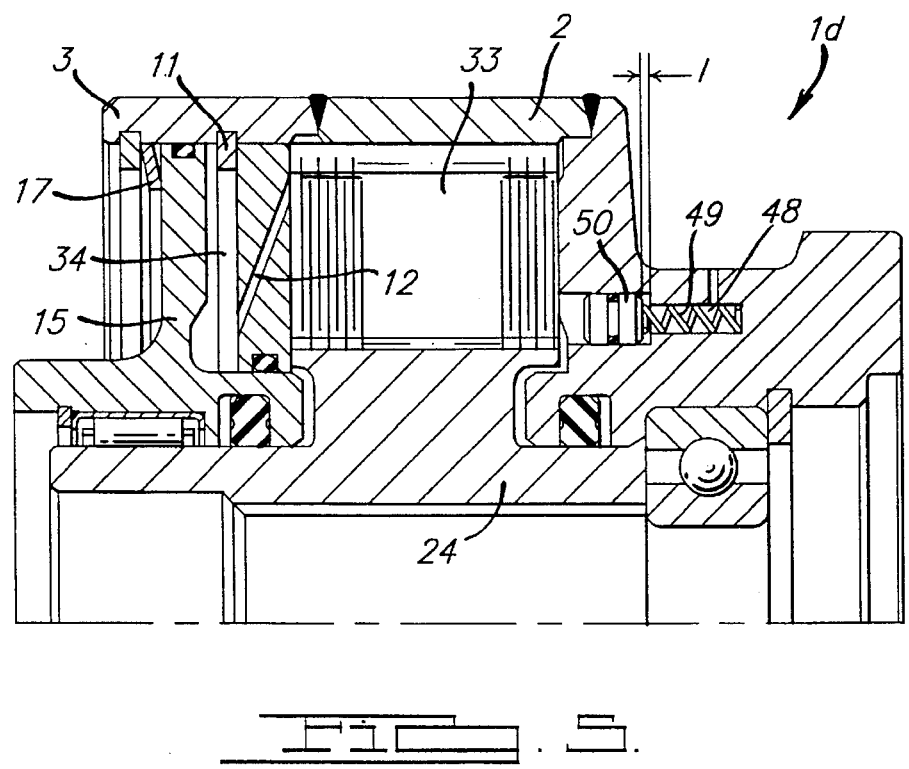
FIG. 5. is half a longitudinal section view through a further embodiment of a coupling according to FIG. 3, having an escape chamber to achieve a delay in Progressivity.

Alternatively, progressivity may be delayed by a solution according to FIG. 5. In the case of the embodiment according to FIG. 5, the operating chamber 33 is followed by an escape chamber 48, which communicates directly with the operating chamber 33. A piston 50, loaded by a spring 49, is axially movable in the escape chamber 48. The escape chamber 48 is formed by a cylindrical bore. The maximum volume which the escape chamber is able to assume by displacing the piston 50 against the force of the spring 49 determines the delay in terms of time with which progressivity occurs. Because of the direct communication between the operating chamber 33 and the escape chamber 48, the fluid, in the case of a relative movement, first escapes into the escape chamber 48. The spring rate of the spring 49 is higher than that of the spring 17.

FIG. 6 shows a vehicle 51 for which it is possible to use one of the viscous couplings 1, 1a, 1b, 1c in accordance with the invention. It is a passenger car with a permanent front wheel drive. The vehicle 51 includes a front axle 52 and a rear axle 53. The front wheels 54 are associated with the front axle 52 and the rear wheels 55 with the rear axle 53. An engine 56 is arranged transversely to the direction of driving, in front of the front axle 52. The engine 56 drives the manual gearbox 57 which, in turn, drives the front axle differential 58. The front wheels 54 are each driven by a driveshaft 59.

A distributing drive 60 for driving the rear axle 53 is connected to the front axle differential 58. The distributing drive 60 drives the driveline including the two propeller shaft parts 61, 62 into which one of the viscous couplings 1, 1a, 1b, 1c in accordance with the invention may be incorporated.

The second propeller shaft part 62 drives the rear axle differential 63 which drives the driveshafts 64 and the rear wheels 55. It is a vehicle with a permanent front wheel drive and a drive for the rear wheels in those cases where a speed differential occurs between the front wheels 54 and the rear wheels 55 so that the viscous coupling 1 responds.

While the above detailed description describes the preferred embodiment of the present invention, the invention is susceptible to modification, variation, and alteration without deviating from the scope and fair meaning of the subjoined claims.

What is claimed is:

1. A viscous coupling comprising:

a housing rotatable around a rotational axis;

a hub rotatable relative to said housing, said housing and hub, together, forming an operating chamber having a certain fixed minimum volume;

annular outer plates forming a first set of plates and annular inner plates forming a second set of plates which, in an at least partially radially overlapping way, are alternately arranged in said operating chamber in a certain sequence, said outer plates non-rotatably connected to the housing and said inner plates non-rotatably connected to the hub, said plates of one of said first and second set of plates, arranged at a fixed distance from one another in the operating chamber, and the plates of the other set of plates being axially movably arranged in the operating chamber;

a compensating chamber formed in said housing and hub, said compensating chamber being separated from the operating chamber and serving to accommodate any fluid escaping from the operating chamber through at least one throttling bore permanently connecting said two chambers, and said compensating chamber being variable between a maximum and a minimum volume and said compensating chamber loaded by pressure means for assuming the minimum volume;

a highly viscous fluid in the operating chamber, and in the compensating chamber filling said chambers 100% when the compensating chamber assumes its minimum volume, and in the case of a relative rotation between the housing and the hub said fluid is subject to shear;

and means for pre-loading the fluid.

2. A viscous coupling according to claim 1, wherein said pressure means including a movable wall which is loaded by a spring.

3. A viscous coupling according to claim 1, wherein the housing includes a housing extension which surrounds the compensating chamber and a separating wall for separating the compensating chamber from the operating chamber.

4. A viscous coupling according to claim 2, wherein said movable wall is axially movably guided at an inner face of a housing extension associated with the compensating chamber and relative to the hub.

5. A viscous coupling according to claim 4, wherein said movable wall is sealed by seals relative to the inner face of the housing extension and relative to the hub.

6. A viscous coupling according to claim 3, wherein said at least one throttling bore is arranged in the separating wall.

7. A viscous coupling according to claim 6, wherein each throttling bore extends at an angle, starting from its opening radially approaching the hub and positioned at the compensating chamber end, to its opening radially approaching teeth of the housing and positioned at the operating chamber end.

8. A viscous coupling according to claim 2, wherein axial movement of the movable wall is limited.

9. A viscous coupling according to claim 3, wherein the separating wall includes at least one further aperture which is closed by a slide and positioned between the operating chamber and the compensating chamber and which is opened by the slide for exchanging fluid when a predetermined absolute speed of the viscous coupling is exceeded.

10. A viscous coupling according to claim 9, wherein the slide is actuated by centrifugal force.

11. A viscous coupling according to claim 10, wherein the slide is radially movably guided in a radial bore of the separating wall and is loaded by a closing spring in the direction of the closing position.

12. A viscous coupling according to claim 1, wherein a pin made of a material whose expansion coefficient is greater than that of the material of the separating wall is inserted into said at least one throttling bore.

13. A viscous coupling according to claim 2, wherein to a limited extent, a separating wall is axially movable in the direction of the movable wall for the purpose of increasing the operating chamber.

14. A viscous coupling according to claim 1, wherein an escape chamber with a variable but limited volume is connected to the operating chamber.

15. A viscous coupling according to claim 14, wherein the escape chamber is formed by a bore having a piston, which is adjustable therein against a spring.

* * * * *

UNITED STATES PATENT AND TRADEMARK OFFICE
CERTIFICATE OF CORRECTION

PATENT NO. : 5,562,191
DATED : October 8, 1996
INVENTOR(S) : Theodor GaSSmann

It is certified that error appears in the above-indentified patent and that said Letters Patent is hereby corrected as shown below:

Column 4, Line 52, after "FIG 1" insert --- is ---.

Column 5, Line 7, after "FIG 6" insert --- is ---.

Column 8, Line 8, after housing, delete "10" and
--- 2 ---.

Signed and Sealed this

Eighth Day of April, 1997

Attest:

BRUCE LEHMAN

Attesting Officer

Commissioner of Patents and Trademarks